United States Patent [19]
Speldrich

[11] Patent Number: 5,792,958
[45] Date of Patent: Aug. 11, 1998

[54] PRESSURE SENSOR WITH A COMPRESSIBLE INSERT TO PREVENT DAMAGE FROM FREEZING

[75] Inventor: Jamie W. Speldrich, Freeport, Ill.

[73] Assignee: Honeywell Inc., Minneapolis, Minn.

[21] Appl. No.: 786,820

[22] Filed: Jan. 21, 1997

[51] Int. Cl.⁶ .................. G01L 9/06; G01L 9/12; G01L 9/08
[52] U.S. Cl. .................. 73/727; 73/724; 73/726; 73/756; 338/42; 361/283.4
[58] Field of Search ............ 73/724, 727, 726, 73/722, 721, 720, 718, 756; 338/42; 361/283.4

[56] References Cited
U.S. PATENT DOCUMENTS

| | | | |
|---|---|---|---|
| 4,168,630 | 9/1979 | Shirouzu et al. | 73/727 |
| 5,184,107 | 2/1993 | Maurer . | |
| 5,186,055 | 2/1993 | Kovacich et al. | 73/727 |
| 5,257,546 | 11/1993 | Tobita et al. | 73/727 |
| 5,351,550 | 10/1994 | Maurer . | |
| 5,410,916 | 5/1995 | Cook et al. . | |
| 5,412,994 | 5/1995 | Cook et al. . | |
| 5,515,732 | 5/1996 | Willcox et al. | 73/724 |

Primary Examiner—George M. Dombroske
Assistant Examiner—Joseph L. Felber
Attorney, Agent, or Firm—William D. Lanyi; Roland W. Norris

[57] ABSTRACT

A pressure sensor is provided with a compressible insert that is disposed within an internal opening of a potentially frangible component, such as a tubular glass member. If a condensate forms within the internal opening of the tubular glass member, freezing of the condensate can cause it to expand and damage the glass member. The compressible insert absorbs the expansion of the liquid condensate by compressing and prevents the expanding condensate from cracking the tubular glass member. The compressible insert, in a particularly preferred embodiment of this invention, has an opening extending therethrough to facilitate the transmission of pressure throughout the aligned openings of the pressure sensor. In one particular embodiment, a silicone die is etched to provide a cavity and corresponding diaphragm portion on which piezoresistive elements are disposed. The silicon pressure die is attached, by anodic bonding, to the tubular glass member and the tubular glass member is, in turn, attached to a tubular support member. The tubular support member can be attached to a metallic conduit structure to facilitate connection of the pressure sensor to a tube or hose.

34 Claims, 7 Drawing Sheets

PRESSURE SENSOR WITH A COMPRESSIBLE INSERT TO PREVENT DAMAGE FROM FREEZING

BACKGROUND OF THE INVENTION

1. Field of the Invention

The present invention is generally related to pressure sensors and, more particularly, to a pressure sensor that is provided with a compressible insert disposed within a glass tubular support for a silicon pressure sensor die in order to protect the glass support from potential fracture as result of an expansion of freezing liquid within its central opening.

2. Description of the Prior Art

Many different types of pressure sensors are known to those skilled in the art. One particular type of pressure sensor incorporates a silicon die that has one or more piezoresistive elements disposed on a surface of the die. When the silicon die is supported in a way that exposes its opposite planar surfaces to differential pressures, flexure of the silicon die creates a stress in the piezoresistive elements which enables an output signal to be responsive to the pressure differential.

U.S. Pat. No. 5,412,994, which issued to Cook et al on May 9, 1995, discloses an offset pressure sensor in which the pressure sensing components are isolated from a portion of an attached buffer member which is connected to a fluid conduit. The offset characteristic of the pressure sensor isolates stress from being transmitted between an attached external fluid conduit and the sensitive components of the pressure sensor. One embodiment of the sensor solders a fluid conduit structure to a buffer member that is attached to a pressure sensor die. An alternative embodiment of the sensor avoids the need for making solder connections between the sensor structure and the external components by utilizing elastomeric conductors and pressure seals in association with the pressure sensor composite structure and first and second housing structures. These elastomeric conductors also provide improved stress isolation. The housing structures are used to compress the seal and the elastomeric conductor against selected portions of the composite sensor.

U.S. Pat. No. 5,410,916, which issued to Cook on May 2, 1995, describes a flowthrough pressure sensor which avoids the creation of crevices and creases that could make it difficult to clean the sensor. The sensor is particularly adapted for use in applications that require cleansing to avoid the build-up of bacterial-laden material. The flowthrough pressure sensor is particularly adapted for use in the measurement of bodily fluids. A first conduit is connected in fluid communication with a second conduit which, in turn, is associated with a pressure sensitive element and two compressible seals. A housing member is provided with an opening into which the compressible seals in the pressure sensitive element are disposed. A latching mechanism is provided to force the housing against a boss portion of the first conduit so that the seals and the pressure sensitive element are compressed therebetween.

U.S. Pat. No. 5,351,550, which issued to Maurer on Oct. 4, 1994, discloses a pressure sensor that is adapted for use with a component carrier. The transducer is provided with a housing member that attaches to a rigid and generally planar member, such as a ceramic circuit board. The legs of the housing member can pass through holes in the circuit board or, alternatively, can attach to edges thereof. The legs of the housing are provided with bails which have steps to cease the circuit board after the legs are flexed to permit insertion of the board between them. The housing is provided with an opening that is shaped to receive a media seal, a pressure sensor die and a conductive seal between a surface of the opening and a surface of the ceramic circuit board. When the circuit board is attached to the housing, the seals and the pressure sensor die are compressed therebetween to provide good fluid sealing association between the components and to also provide electrical communication between the components on the pressure sensor die and components on the circuit board. An alternative embodiment of the present invention comprises two housing members that are attached to opposite sides of the same circuit board so that a differential pressure can be measured.

U.S. Pat. No. 5,184,107, which issued to Maurer on Feb. 3, 1993, describes a piezoresistive pressure transducer with a conductive elastomeric seal. The low cost piezoresistive pressure transducer utilizes premolded elastomeric seals in which at least one seal is electrically conductive. A piezoresistive stress sensitive element in the form of a diaphragm of semiconductor material having a thickened rim is held at its rim between a pair of premolded elastomeric seals in a two piece housing. Electrical connections with external circuitry are made by conductive paths through one of the elastomeric seals which makes contact with electrical leads which pass through the housing wall.

The patents described immediately above are hereby expressly incorporated by reference in this description. These issued United States Patents describe various types of applications in which a pressure sensor die made of silicon and provided with piezoresistive elements is applied to detect a pressure within a preselected space. Some pressure sensor dies are etched on one surface to define a diaphragm portion in the opposite planar surface of the die. Alternatively, unetched dies can be used. These are referred to as slab dies by those skilled in the art of pressure sensing. The use of silicon dies permits pressure sensors to be miniaturized.

Certain applications of pressure sensors expose the sensor components to certain stresses that could possible be damaging to the components. For example, if a pressure sensor is used in an application where a fluid can accumulate in the region proximate the potentially delicate components of the sensor, freezing of the liquid could cause an expansion within those delicate components that could possibly cause damage. One particular application in which this deleterious situation can arise is the use of a pressure sensor in conjunction with an automobile fuel system. If, because of changes in temperature, condensation forms within the inner structure of delicate pressure sensor components, freezing of the liquid condensate can form ice that expands and cracks the components.

It would therefore be significantly beneficial if a means could be found to prevent the damage of delicate components if condensate freezes within those components.

SUMMARY OF THE INVENTION

The present invention provides a pressure sensor that comprises a pressure sensitive component and a tubular glass member attached to the pressure sensitive component. It further comprises a tubular support member that is attached to the tubular glass member, with the tubular glass member being disposed between the pressure sensitive component and the tubular support member. In addition, the present invention comprises a compressible insert disposed within the tubular glass member.

In a preferred embodiment of the present invention, the pressure sensitive component comprises a silicon substrate and at least one piezoresistive element disposed on a first surface of the silicon substrate. The silicon substrate can be etched to form a cavity in a second surface of the substrate. The formation of this cavity defines a diaphragm portion of the first surface proximate the cavity. The piezoresistive element is disposed on the diaphragm portion.

The tubular glass member is generally rectangular in cross section with a generally square opening extending therethrough. The tubular support is generally circular in cross section and comprises a generally circular opening extending therethrough. However, it should be clearly understood that the cross sectional shapes of the components of the pressure sensor are not limiting to the scope of the present invention.

In a particularly preferred embodiment of the present invention, the tubular support member is metallic and comprises an alloy of 36 percent nickel and 64 percent iron. This alloy is referred to by those skilled in the art as Invar. However, it should be understood that alternative materials can be used for the tubular support member and the specific material chosen and described below in terms of the preferred embodiment of the present invention is not limiting to its scope. The tubular glass member, in a particularly preferred embodiment of the present invention, can be made of a low expansion borosilicate glass material referred to by those skilled in the art as "Hoya glass" and is available from Hoya Optics of Freemont, Calif. as Catalog No. "SD-2". This glass has a thermal coefficient of expansion that is closer to that of silicon than other commonly used types of glass. PYREX (Trademark) glass, another type of low expansion borosilicate glass available from Corning, Inc. of Corning, N.Y. can also be used, but the modulus of elasticity of PYREX glass, which 9.5 Mpsi, is less advantageous is certain applications than the Hoya SD-2 type glass which has a modulus of elasticity of approximately 12.6 Mpsi. Although certain applications of pressure sensors require that particular attention be paid to the coefficients of thermal expansion and moduli of elasticity of the constituent components, these factors are not limiting to the present invention and are not critical to every application of the present invention.

BRIEF DESCRIPTION OF THE DRAWINGS

The present invention will be more fully and completely understood from a reading of the Description of the Preferred Embodiment in conjunction with the drawings, in which:

FIGS. 1A–4A and 1B–4B show various views of the components of a pressure sensor made in accordance with the present invention;

DESCRIPTION OF THE PREFERRED EMBODIMENT

Throughout the Description of the Preferred Embodiment, like components will be identified by like reference numerals.

Figure 1A:
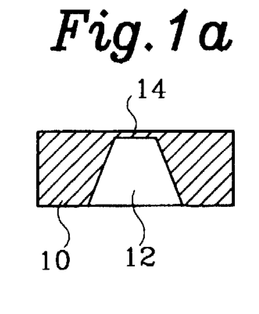

FIG. 1A is a sectional view of a silicon diaphragm 10. A first surface of the diaphragm is etched to provide a cavity 12. This cavity 12 defines a thinned region, or diaphragm portion 14, in the second surface of the silicon die. The first and second surfaces of the die, as illustrated in FIG. 1A, are planar and generally parallel to each other.

Figure 1B:
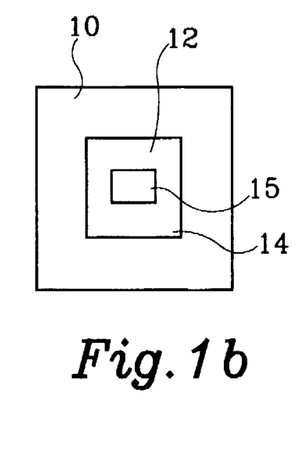

FIG. 1B is a bottom view of the pressure sensor die shown in FIG. 1A. The cavity 12 is etched, by known etching techniques, in the second surface of the die 10 to form the diaphragm region with a piezoresistive element 15 thereon. Although the present invention will be described in terms of its application with a pressure sensor die having an etched cavity and a diaphragm, it should be clearly understood that the principles of the present invention could equally be applied to a pressure sensor that incorporates a slab die which is a silicon substrate that is not etched to provide the cavity and diaphragm region.

Figure 2A:
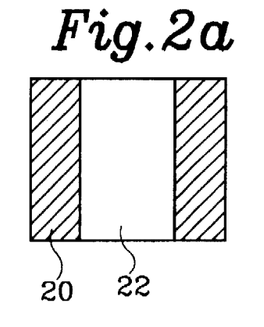
Figure 2B:
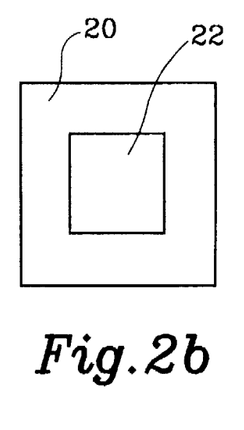

FIG. 2A is a tubular glass member 20 that has an opening 22 extending therethrough. As shown in the bottom view of the tubular glass member 20 in FIG. 2B, it is generally rectangular in cross section and the opening 22 is also generally rectangular. Although preferably made of glass, the tubular member 20 can be composed of other suitable material including silicon. Although the cross sectional shape of the tubular glass member is not limiting to the concepts of the present invention, it has been found to be beneficial to generally match the shapes of the die 10 and the tubular glass member 20.

Figure 3A:
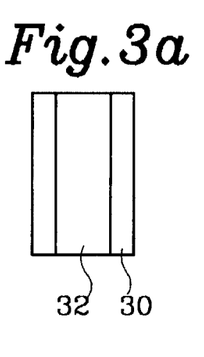
Figure 3B:
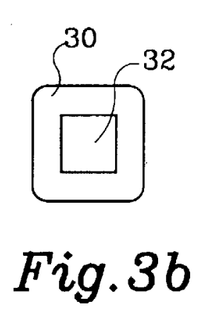

FIG. 3A is a sectional view of a compressible insert 30 having a definite form, i.e. not a free gas, that has an opening 32 extending therethrough. As can be seen in the bottom view shown in FIG. 3B, the corners 34 of the compressible insert are rounded slightly. This rounding of the corners is not a requirement of all embodiments of the present invention.

Figure 4A:
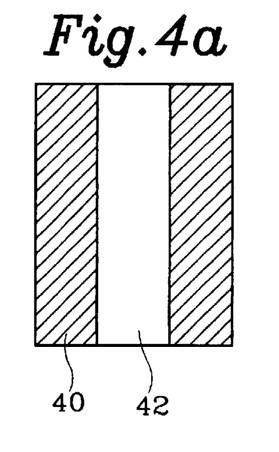
Figure 4B:
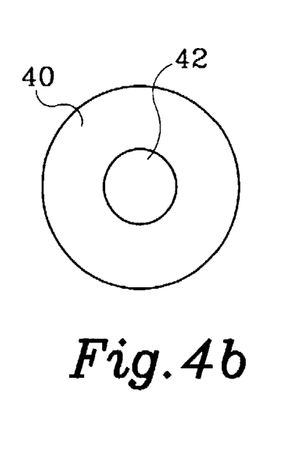

FIG. 4A is a tubular support member 40 with an opening 42 extending therethrough. As shown in the bottom view in FIG. 4B, the tubular support member is generally circular in cross section and has a generally circular opening 42 extending therethrough.

The compressible insert 30 is shaped to be received in the opening 22 of the tubular glass member 20. The pressure sensitive component 10 and the tubular glass member 20 are shaped to be attached to each other as will be described below. The tubular support member 40 is then attached to a bottom surface of the tubular glass member 20 with the compressible insert 30 disposed in the opening 22 of the tubular glass member 20.

Figure 5:
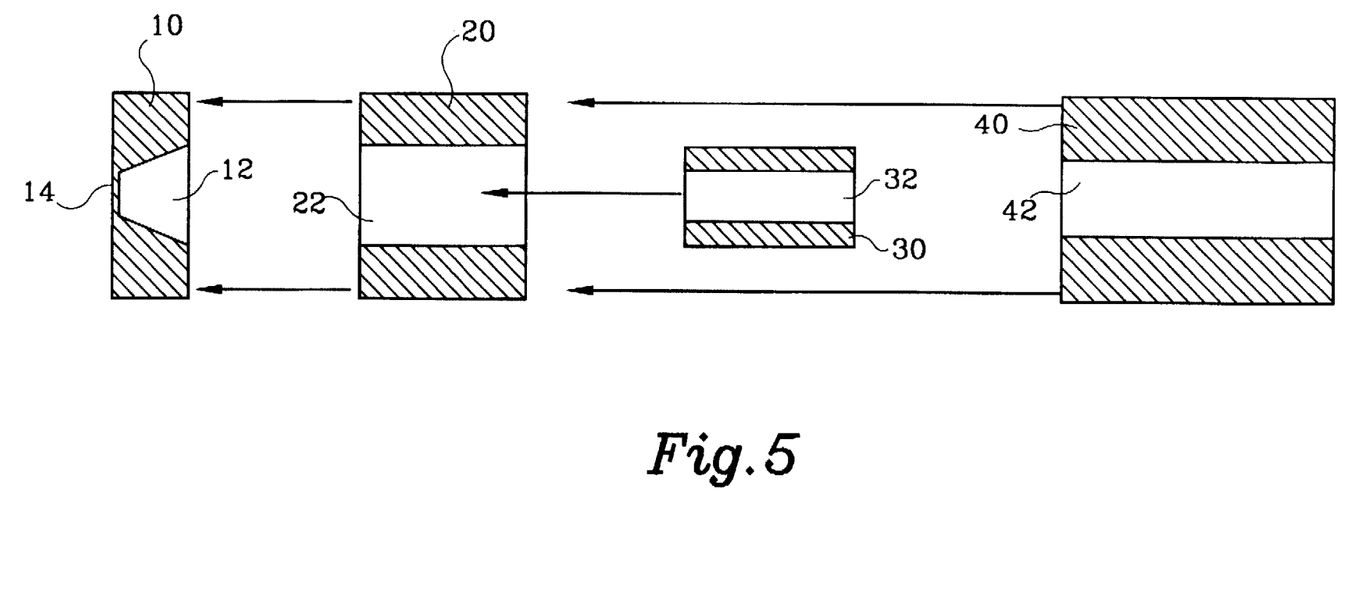
FIG. 5 is an exploded view of a pressure sensor comprising the present invention.

FIG. 5 shows the components illustrated in FIGS. 1A–4A in the manner that they will be assembled together. The tubular glass member 20 is attached to the second surface of the pressure sensor die 10 by a process that is known to those skilled in the art by the term "anodic bonding". Alternatively, this process of attaching the tubular glass member 20 to the pressure sensor die 10 is referred to as "thermoelectric bonding". These processes are well known to those skilled in the art and will not be described in greater detail herein. Typically, these bonding processes are performed while the die 10 and the tubular glass member 20 are attached to a wafer containing a plurality of similar components. The wafers of die members and glass members are then bonded to each other prior to the separation of the individual components from like components on the wafers that have been attached to each other.

With continued reference to FIG. 5, the compressible insert 30 is disposed within the opening 22 of the tubular glass member 20. The tubular support member 40 is then attached to an axial surface of the tubular glass member 20, typically by a soldering process that could use a solder material comprising an alloy of approximately 96.5 percent tin and 3.5 percent silver. Alternative alloys can be used for this purpose. In a typical operation, a preplaced solder element would be disposed in contact with one of the two surfaces to be attached together and, after the other surface is moved into contact with the preplaced solder member, the temperature is raised in order to melt the solder and attach the tubular glass member 20 to the tubular support member 40.

Figure 6:
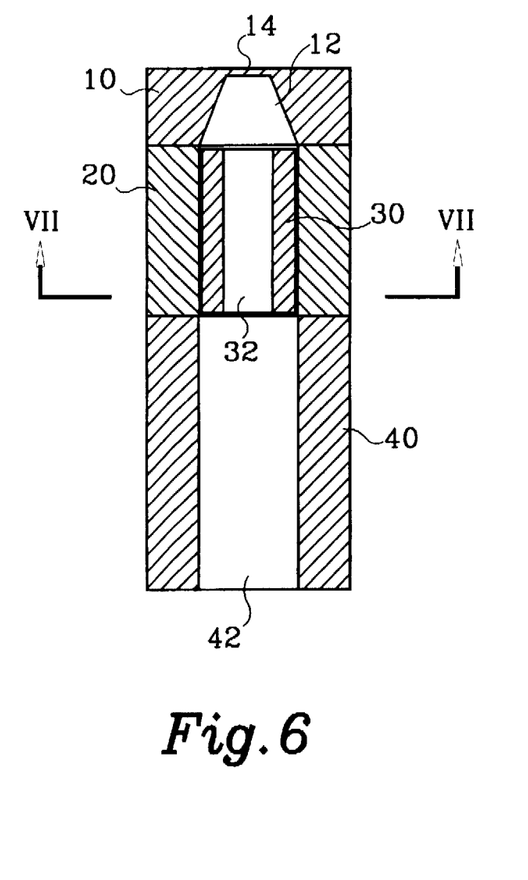
FIG. 6 is an assembled view of the components shown in FIG. 5.

FIG. 6 shows the components of FIG. 5 attached together. The compressible insert 30 is shown within the opening of the tubular glass member 20. It should be noted that the compressible insert 30 does not adversely affect the free flow of fluid through the spaces of the cavity 12, the opening 32 and the opening 42. The compressible insert serves a very valuable function in the pressure sensor structure of FIG. 6. If a liquid forms within the openings of the components, that liquid could possible freeze and expand. If the liquid freezes, its expansion could seriously damage the delicate components of the pressure sensor. For example, the tubular glass support 20 could easily fracture if a liquid within its opening 22 expands due to freezing. Although damage can also occur to the other components, such as the pressure sensor die 10 and the tubular support member 40, it has been observed that the most likely damage to occur as a result of freezing condensate within the structure is the tubular glass member 20.

The compressible insert 30 serves the valuable purpose of compressing in response to expansion of a freezing liquid within the opening 22 of the tubular glass member 20. As the liquid, such as water in a fuel system, condenses within the opening 22 as a result of decreasing temperatures, it expands at the expense of a corresponding contraction or compression of the compressible insert 30. As a result, the expansion of the liquid within the opening 22 of the tubular glass member 20 does not expand the tubular glass member 20 sufficiently to damage it.

Figure 7:
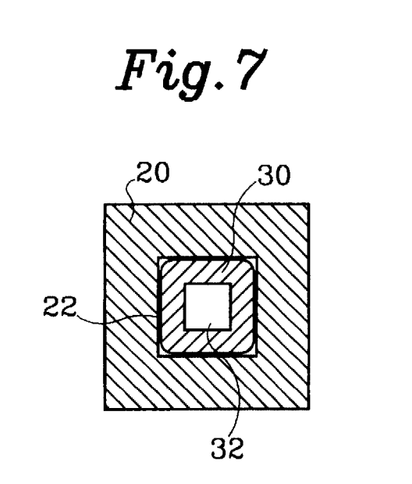
FIG. 7 is a sectional view of FIG. 6.

FIG. 7 is a sectional view of FIG. 6 showing the compressible insert 30 disposed in the opening 22 of the tubular glass member 20. The opening 32 of the compressible insert 30 allows the free movement of a fluid whose pressure is being monitored. However, if a condensation liquid forms within the opening 22 or the opening 32, the effect of its expansion upon freezing will be absorbed by a corresponding compression of the compressible insert 30.

Figure 8:
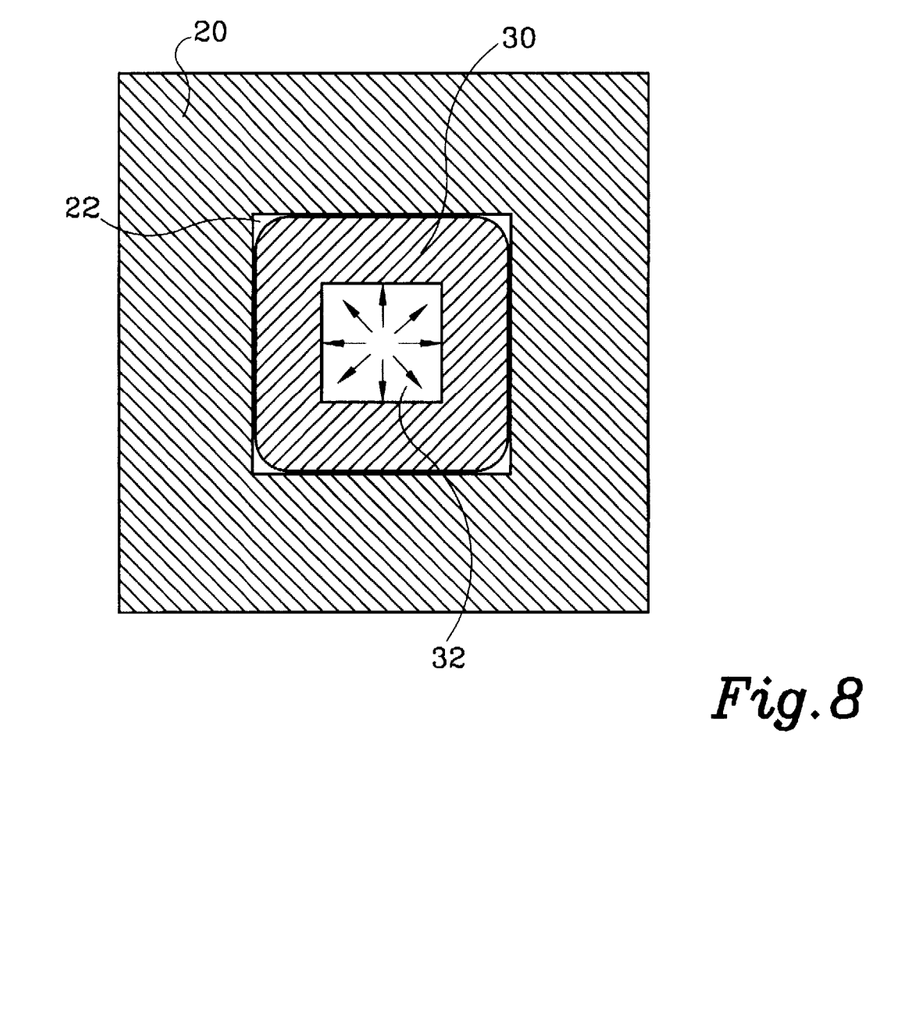
FIG. 8 is an expanded view of FIG. 7.

FIG. 8 is an enlarged view of FIG. 7 with the addition of illustrative arrows to illustrate the operation of the present invention. Within opening 32, the expansion of freezing condensate is represented by the arrows. As the arrows press outwardly against the inner surface of opening 32, the compressible insert 30 can react in a plurality of ways. First, it is expected that the compressible insert 30 will expand outward until it achieves intimate contact with the inner surface of opening 22. Then, further expansion of the liquid condensate will cause the thickness of the walls of the compressible insert 30 to compress. This compression will absorb the expansion of the liquid condensate as it freezes. As a result, the damaging forces that could otherwise result from the expansion of the liquid condensate are elevated and the damage is prevented.

Figure 9:
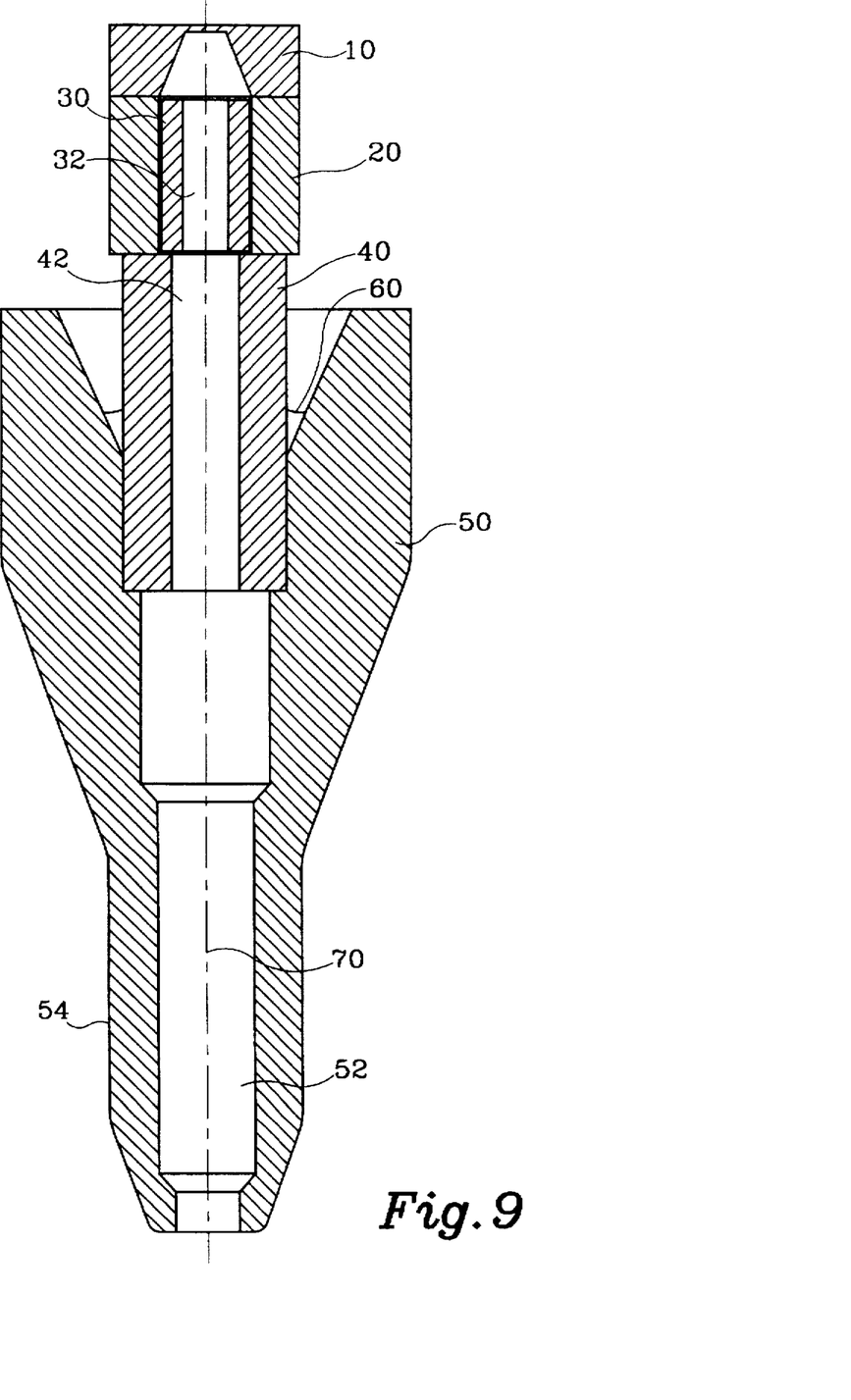
FIG. 9 shows a sectional view of a pressure sensor incorporating the present invention.

FIG. 9 shows the assembly of FIG. 6 attached to a metallic conduit structure 50. A central opening 5 extends through the metallic conduit structure 50. The tubular support member 40 is brazed to the metallic conduit structure 50 as represented by reference numeral 60. The openings, 32, 42 and 52 are connected in fluid communication with each other and generally aligned along axis 70. The outer surface 54 of the metallic conduit structure 50 is shaped to facilitate the attachment of the pressure sensor to a hose or tubing.

With continued reference to FIG. 9, the metallic conduit structure 50 is typically made of stainless steel, the tubular support member 40 can be made of Invar type described above, the tubular glass member 20 can be made of borosilicate glass and the pressure sensor 10 can be made of silicon. Pressure from a connected hose or tubing is transmitted through opening 52 to opening 42 and opening 32 within the compressible insert 30 that is disposed in opening 22 of the tubular glass member 20. This pressure then is transmitted into the cavity of the pressure sensor die 10 and sensed by the piezoresistive elements on the first surface, or upper surface of the silicon substrate illustrated in FIG. 9. If condensate forms within the openings extending through the pressure sensor and the condensate freezes, the presence of the compressible insert 30 will prevent damage to the tubular glass member 20.

In a preferred embodiment of the present invention, the compressible insert comprises a flourosilicone material. However, although a flourosilicone material has been tested and has exhibited beneficial characteristics during the soldering and brazing operations, other compressible material can be used in its place as long as they provide the necessary amount of compressibility to counteract the expansion of the condensate and they are with able to withstand the temperatures imposed on the device during manufacturing and use.

Figure 10:
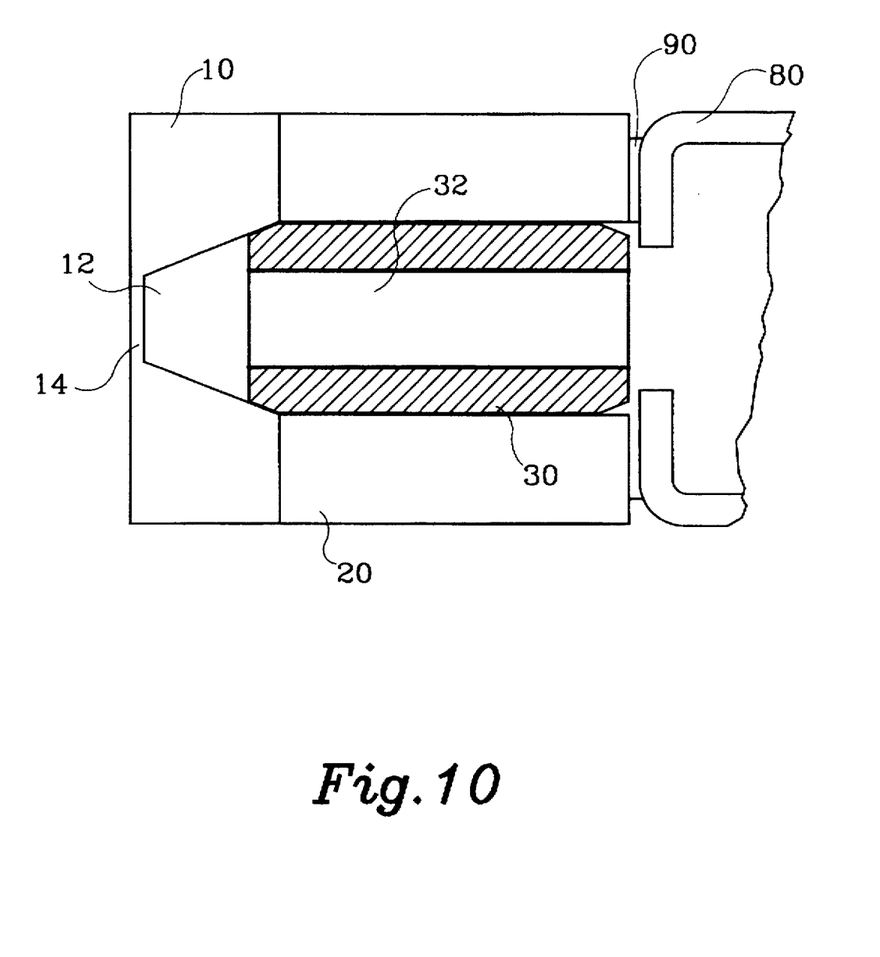
FIG. 10 shows an alternative configuration incorporating the present invention.

FIG. 10 illustrates an alternative arrangement of components of the pressure sensor. The basic philosophy of operation is the same as that described above, but the tubular support member 40 is replaced by an alternative structure 80 in FIG. 10. The pressure sensor die 10 with its cavity 12 and diaphragm 14 is the same as described above. The tubular glass member 20, with its opening 22 and compressible insert 30 are also the same as described above. However, instead of soldering a tubular support member 40 to the tubular glass member 20, a thinner member 80 with upset ends is soldered to the tubular glass member 20, as indicated by reference numeral 90 in FIG. 10. It should be understood that the advantageous characteristics of the present invention relates to the provision of a means for preventing an expanding condensate from damaging the tubular glass member 20. The precise shape and type of pressure sensor die or tubular support member, 40 or 80, is not relevant to the operation of the present invention. Furthermore, the cross sectional shapes of the various components, whether they be rectangular or circular, and the cross sectional shapes of the openings extending through those components, whether they be rectangular or circular, are not limiting to the present invention and can vary from one application to another.

Figure 11:
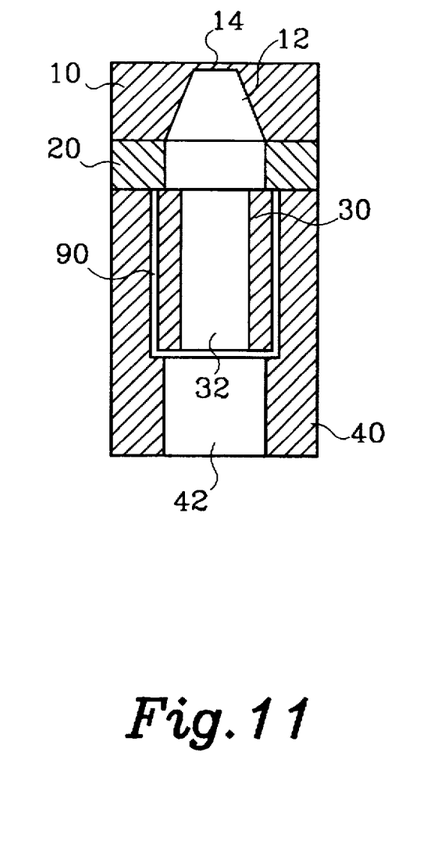
FIG. 11 is an alternative embodiment of the present invention.

FIG. 11 shows an alternative embodiment of the present invention in which the compressible insert 30 is disposed at a slightly different location than that described above. By comparing FIGS. 6 and 11, it can be seen that the compressible insert 30 in FIG. 6 is disposed with a glass member 20 that is approximately as long as the compressible insert itself. As a result, the compressible insert 30 does not protrude a significant distance into the opening 42 of the tubular support member 40. The embodiment of the present invention shown in FIG. 11, on the other hand, comprises a glass member 20 that is significantly shorter in axial length than one shown in FIG. 6. In embodiments of the pressure sensor such as that shown in FIG. 11, the tubular support member 40 can be provided with a counter sink 90 that is shaped to receive the compressible insert 30 within it. As a result, the compressible insert 30 may not protrude up into the opening which extends through the glass member 20. However, the compressible insert 30 is disposed within the conduit formed by the alignment of opening 42, the opening extending through the glass member 20 and the cavity 12. Even when a slab die pressure transducer is used, the opening extending through the glass member 20 and the opening 42 of the support member 40 provide a conduit in which the compressible insert 30 is disposed. In all embodiments of the present invention, the compressible insert 30 serves the purpose of compensating for the expanding liquid within this conduit as the liquid freezes. Whether the compressible insert 30 is disposed within the opening of the glass member 20 or the opening 42 of the support member 40 is not limiting to the present invention.

Although the present invention has been described with particular detail and illustrated with specificity to describe one embodiment of the present invention, it should be understood that alternative embodiments are also within its scope. For example, although the compressible insert has been described as being made of a flourosilicone material, alternative materials can be used. Similarly, the metallic conduit structure has been described as being made of stainless steel, but can be made of other materials.

The embodiments of the invention in which an exclusive property or right is claimed are defined as follows:

What is claimed is:

1. A pressure sensor, comprising:

a pressure sensitive component;

a glass member attached to said pressure sensitive component, said glass member having an opening extending therethrough;

a tubular support member attached to said glass member, said glass member being disposed between said pressure sensitive component and said tubular support member, said tubular support member being aligned with said opening of said glass member to form a conduit in fluid communication with said pressure sensitive component; and a compressible insert of definite form disposed within said conduit.

2. The sensor of claim 1, wherein:

said pressure sensitive component comprises a silicon substrate and at least one piezoresistive element disposed on a first surface of said silicon substrate.

3. The sensor of claim 2, wherein:

said silicon substrate is etched to form a cavity in a second surface of said silicon substrate, said cavity defining a diaphragm portion of said first surface proximate said cavity, said piezoresistive element being disposed on said diaphragm portion, said cavity being disposed in fluid communication with said conduit.

4. The sensor of claim 1, wherein:

said glass member is generally rectangular in cross section with a generally square opening extending therethrough.

5. The sensor of claim 1, wherein:

said tubular support member is generally circular in cross section.

6. The sensor of claim 5, wherein:

said tubular support member comprises a generally circular opening extending therethrough.

7. The sensor of claim 1, wherein:

said tubular support member is metallic.

8. The sensor of claim 7, wherein:

said tubular support member is an alloy of 36% nickel and 64% iron.

9. The sensor of claim 1, further comprising:

a metallic conduit structure attached to said tubular support member.

10. The sensor of claim 9, wherein:

said metallic conduit structure is made of stainless steel.

11. The sensor of claim 1, wherein:

said compressible insert comprises a flourosilicone material.

12. A pressure sensor, comprising:

a pressure sensitive component, said pressure sensitive component comprising a silicon substrate and at least one piezoresistive element disposed on a first surface of said silicon substrate, said silicon substrate being etched to form a cavity in a second surface of said silicon substrate, said cavity defining a diaphragm portion of said first surface proximate said cavity, said piezoresistive element being disposed on said diaphragm portion;

a tubular glass member attached to said pressure sensitive component;

a tubular support member attached to said tubular glass member, said tubular glass member being disposed between said pressure sensitive component and said tubular support member; and a compressible insert of definite form disposed within said tubular glass member.

13. The sensor of claim 12, wherein:

said tubular glass member is generally rectangular in cross section with a generally square opening extending therethrough.

14. The sensor of claim 12, wherein:

said tubular support member is generally circular in cross section.

15. The sensor of claim 14, wherein:

said tubular support member comprises a generally circular opening extending therethrough.

16. The sensor of claim 12, wherein:

said tubular support member is metallic.

17. The sensor of claim 16, wherein:

said tubular support member is an alloy of 36% nickel and 64% iron.

18. The sensor of claim 12, further comprising:

a metallic conduit structure attached to said tubular support member, said metallic conduit structure being made of stainless steel.

19. The sensor of claim 12, wherein:

said compressible insert comprises a flourosilicone material.

20. A pressure sensor, comprising:

a pressure sensitive component, said pressure sensitive component comprising a silicon substrate and at least one piezoresistive element disposed on a first surface of said silicon substrate, said silicon substrate being etched to form a cavity in a second surface of said silicon substrate, said cavity defining a diaphragm portion of said first surface proximate said cavity, said piezoresistive element being disposed on said diaphragm portion;

a tubular glass member attached to said pressure sensitive component;

a tubular support member attached to said tubular glass member, said tubular glass member being disposed between said pressure sensitive component and said tubular support member;

a compressible insert disposed within said tubular glass member, said compressible insert comprising a flourosilicone material, said tubular glass member being generally rectangular in cross section with a generally square opening extending therethrough, said tubular support being generally circular in cross section, said tubular support member comprising a generally circular opening extending therethrough, said tubular support member is an alloy of 36% nickel and 64% iron; and a metallic conduit structure attached to said tubular support member, said metallic conduit structure being made of stainless steel.

21. A pressure sensor comprising:

a pressure sensitive component;

a first member attached to said pressure sensitive component, said first member having an opening extending therethrough;

a second member attached to said first member, said first member being disposed between said pressure sensitive component and said second member, said second member being aligned with said opening of said first member to form a conduit in fluid communication with said pressure sensitive component; and a compressible insert of definite form disposed within said conduit.

22. The sensor of claim 21, wherein said first member is glass.

23. The sensor of claim 21, wherein said pressure sensitive component comprises a silicon substrate and at least one piezoresistive element disposed on a first surface of said silicon substrate.

24. The sensor of claim 23, wherein said silicon substrate is etched to form a cavity in a second surface of said silicon substrate, said cavity defining a diaphragm portion of said first surface proximate said cavity, said piezoresistive element being disposed on said diaphragm portion, said cavity being disposed in fluid communication with said conduit.

25. The sensor of claim 21, wherein said first member is generally rectangular in cross section with a generally square opening extending therethrough.

26. The sensor of claim 21, wherein said second member is a support member generally circular in cross section.

27. The sensor of claim 26, wherein said second member comprises a generally circular opening extending therethrough.

28. The sensor of claim 21, wherein said second member is metallic.

29. The sensor of claim 28, wherein said second member comprises an alloy of nickel and iron.

30. The sensor of claim 21, further comprising a metallic conduit structure attached to said second member.

31. The sensor of claim 30, wherein said metallic conduit structure is made of stainless steel.

32. A pressure sensor, comprising:

a pressure sensitive component, said pressure sensitive component comprising a silicon substrate and at least one piezoresistive element disposed on a first surface of said silicon substrate, said silicon substrate being etched to form a cavity in a second surface of said silicon substrate, said cavity defining a diaphragm portion of said first surface proximate to said cavity, said piezoresistive element being disposed on said diaphragm portion;

a first member attached to said pressure sensitive component;

a second member attached to said first member, said first member being disposed between said pressure sensitive component and said second member; and a compressible insert of definite form disposed within said first member.

33. The sensor of claim 32, wherein said first member is a glass member.

34. A pressure sensor, comprising:

a pressure sensitive component, said pressure sensitive component comprising a silicon substrate and at least one piezoresistive element disposed on a first surface of said silicon substrate, said silicon substrate being etched to form a cavity in a second surface of said silicon substrate, said cavity defining a diaphragm portion of said first surface proximate said cavity, said piezoresistive element being disposed on said diaphragm portion;

a first member attached to said pressure sensitive component;

a second member attached to said first member, said first member being disposed between said pressure sensitive component and said second member;

a compressible insert of definite form disposed within said first member, said compressible insert comprising a material, said first member being generally rectangular in cross section with a generally square opening extending therethrough, said second member being generally circular in cross section, said second member comprising a generally circular opening extending therethrough, said second member is an alloy of nickel and iron; and a conduit structure attached to said second member, said conduit structure being made of stainless steel.

* * * * *